United States Patent
Wada et al.

(10) Patent No.: US 11,425,341 B2
(45) Date of Patent: Aug. 23, 2022

(54) IMAGE DISPLAY DEVICE AND METHOD FOR CONTROLLING IMAGE DISPLAY DEVICE

(71) Applicant: SEIKO EPSON CORPORATION, Tokyo (JP)

(72) Inventors: Takuto Wada, Nagano (JP); Fumitaka Furuya, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 142 days.

(21) Appl. No.: 16/281,168

(22) Filed: Feb. 21, 2019

(65) Prior Publication Data

US 2019/0260958 A1    Aug. 22, 2019

(30) Foreign Application Priority Data

Feb. 22, 2018  (JP) ............................. JP2018-029443

(51) Int. Cl.
  *H04N 5/74*  (2006.01)
  *H04N 9/31*  (2006.01)
  (Continued)

(52) U.S. Cl.
  CPC ............... *H04N 9/31* (2013.01); *H04N 5/445* (2013.01); *H04N 5/44504* (2013.01);
  (Continued)

(58) Field of Classification Search
  CPC .. H04N 5/74; H04N 5/44504; H04N 5/44582; H04N 9/3147; H04N 21/4122; H04N 21/42204; H04N 5/073; H04N 5/445; H04N 5/765; H04N 7/0135; H04N 7/12; H04N 9/31; H04N 9/3141; H04N 9/3179;
  (Continued)

(56) References Cited

U.S. PATENT DOCUMENTS

| | | | |
|---|---|---|---|
| 5,382,976 A * | 1/1995 | Hibbard | H04N 9/04557 |
| | | | 348/273 |
| 6,243,059 B1 * | 6/2001 | Greene | G09G 3/2092 |
| | | | 345/1.3 |

(Continued)

FOREIGN PATENT DOCUMENTS

| | | | | |
|---|---|---|---|---|
| JP | 2004180059 A | * | 6/2004 | ........... G06T 3/4007 |
| JP | 2004349979 A | * | 12/2004 | ............. G03B 21/00 |
| JP | 2014-146924 A | | 8/2014 | |

Primary Examiner — Magda Cruz
(74) Attorney, Agent, or Firm — Oliff PLC

(57) ABSTRACT

An image display device includes: an image input unit having a plurality of channels; a generation unit which processes input data inputted to each of the plurality of channels and generates display image data for displaying an image of one frame; and a detection unit which detects a missing of input data on each of the channels. If a missing of input data is detected by the detection unit, the generation unit executes interpolation processing to interpolate and generate an image feature quantity of an unset pixel which is a pixel forming the display image data and whose image feature quantity cannot be set due to the missing of input data. In the interpolation processing, the image feature quantity of the unset pixel is interpolated with an image feature quantity of a reference pixel selected from pixels other than the unset pixel.

14 Claims, 6 Drawing Sheets

(51) Int. Cl.
*H04N 5/445* (2011.01)
*H04N 21/422* (2011.01)
*H04N 21/47* (2011.01)

(52) U.S. Cl.
CPC ............ *H04N 5/74* (2013.01); *H04N 9/3147* (2013.01); *H04N 21/42204* (2013.01); *H04N 21/47* (2013.01)

(58) Field of Classification Search
CPC .... H04N 21/47; G09G 5/006; G09G 2330/12; G09G 2370/20; G09G 2370/22
See application file for complete search history.

(56) References Cited

U.S. PATENT DOCUMENTS

| | | | | |
|---|---|---|---|---|
| 6,493,008 B1 * | 12/2002 | Yui | ......................... | H04N 21/47 715/840 |
| 6,848,792 B1 | 2/2005 | De Meerleer | | |
| 8,164,600 B2 * | 4/2012 | Ramon | ..................... | G06T 3/40 345/606 |
| 2002/0039142 A1 * | 4/2002 | Zhang | ....................... | G06T 5/20 348/234 |
| 2004/0032516 A1 * | 2/2004 | Kakarala | .................. | H04N 9/07 348/246 |
| 2005/0068334 A1 * | 3/2005 | Chang | .................... | H04N 7/012 345/617 |
| 2005/0201616 A1 * | 9/2005 | Malvar | .................. | G06T 3/4015 382/167 |
| 2009/0041339 A1 * | 2/2009 | Yamada | ............... | H04N 13/261 382/154 |
| 2011/0211065 A1 * | 9/2011 | Furui | .................... | H04N 9/3147 348/135 |
| 2012/0200588 A1 * | 8/2012 | Posa | ..................... | H04N 9/3185 345/589 |
| 2013/0077825 A1 * | 3/2013 | Katahira | ............ | G06K 9/00805 382/103 |
| 2014/0092221 A1 * | 4/2014 | Nagai | ................... | H04N 13/128 348/51 |
| 2014/0211094 A1 | 7/2014 | Minamoto | | |
| 2015/0085188 A1 * | 3/2015 | Shirani | .................... | H04N 7/01 348/441 |
| 2015/0098019 A1 * | 4/2015 | Takahashi | ................ | H04N 5/04 348/502 |
| 2020/0184925 A1 * | 6/2020 | Huang | .................... | G06T 5/008 |

* cited by examiner

*FIG. 2*

|  | 1ST COLUMN | 2ND COLUMN | 3RD COLUMN | 4TH COLUMN | 5TH COLUMN | 6TH COLUMN | 7TH COLUMN | 8TH COLUMN | 9TH COLUMN | 10TH COLUMN | ... |
|---|---|---|---|---|---|---|---|---|---|---|---|
| 1ST ROW | CH1 | CH1 | CH2 | CH2 | CH1 | CH1 | CH2 | CH2 | CH1 | CH1 | ... |
| 2ND ROW | CH3 | CH3 | CH4 | CH4 | CH3 | CH3 | CH4 | CH4 | CH3 | CH3 | ... |
| 3RD ROW | CH1 | CH1 | CH2 | CH2 | CH1 | CH1 | CH2 | CH2 | CH1 | CH1 | ... |
| 4TH ROW | CH3 | CH3 | CH4 | CH4 | CH3 | CH3 | CH4 | CH4 | CH3 | CH3 | ... |
| 5TH ROW | CH1 | CH1 | CH2 | CH2 | CH1 | CH1 | CH2 | CH2 | CH1 | CH1 | ... |
| 6TH ROW | CH3 | CH3 | CH4 | CH4 | CH3 | CH3 | CH4 | CH4 | CH3 | CH3 | ... |
| 7TH ROW | CH1 | CH1 | CH2 | CH2 | CH1 | CH1 | CH2 | CH2 | CH1 | CH1 | ... |
| 8TH ROW | CH3 | CH3 | CH4 | CH4 | CH3 | CH3 | CH4 | CH4 | CH3 | CH3 | ... |
| ⋮ | ⋮ | ⋮ | ⋮ | ⋮ | ⋮ | ⋮ | ⋮ | ⋮ | ⋮ | ⋮ | ⋮ |

FIG. 4

| | 1ST COLUMN | 2ND COLUMN | 3RD COLUMN | 4TH COLUMN | 5TH COLUMN | 6TH COLUMN | 7TH COLUMN | 8TH COLUMN | 9TH COLUMN | 10TH COLUMN | ... |
|---|---|---|---|---|---|---|---|---|---|---|---|
| 1ST ROW | CH1 | CH1 | CH2 | CH2 | CH1 | CH1 | CH2 | CH2 | CH1 | CH1 | ... |
| 2ND ROW | CH3 | CH3 | CH4 | CH4 | CH3 | CH3 | CH4 | CH4 | CH3 | CH3 | ... |
| 3RD ROW | CH1 | CH1 | CH2 | CH2 | CH1 | CH1 | CH2 | CH2 | CH1 | CH1 | ... |
| 4TH ROW | CH3 | CH3 | CH4 | CH4 | CH3 | CH3 | CH4 | CH4 | CH3 | CH3 | ... |
| 5TH ROW | CH1 | CH1 | CH2 | CH2 | CH1 | CH1 | CH2 | CH2 | CH1 | CH1 | ... |
| 6TH ROW | CH3 | CH3 | CH4 | CH4 | CH3 | CH3 | CH4 | CH4 | CH3 | CH3 | ... |
| 7TH ROW | CH1 | CH1 | CH2 | CH2 | CH1 | CH1 | CH2 | CH2 | CH1 | CH1 | ... |
| 8TH ROW | CH3 | CH3 | CH4 | CH4 | CH3 | CH3 | CH4 | CH4 | CH3 | CH3 | ... |
| ⋮ | ⋮ | ⋮ | ⋮ | ⋮ | ⋮ | ⋮ | ⋮ | ⋮ | ⋮ | ⋮ | ⋮ |

255

IMAGE DISPLAY DEVICE AND METHOD FOR CONTROLLING IMAGE DISPLAY DEVICE

The entire disclosure of Japanese Patent Application No. 2018-029443, filed Feb. 22, 2018 is expressly incorporated by reference herein.

BACKGROUND

1. Technical Field

The present invention relates to an image display device and a method for controlling an image display device.

2. Related Art

According to the related art, a system which divides image data into a plurality of segments and transmits the divided image data through a plurality of communication channels is known (see, for example, JP-A-2014-146924).

JP-A-2014-146924 discloses an image transmitting circuit having: an image mapping unit which divides an original image to generate image segments; and a transmitting unit which corresponds to one of a plurality of communication channels and transmits each image segment through the corresponding communication channel.

However, if an image display device cannot receive an image on one or some of the communication channels, a part of the image to be displayed by the image display device is missing. This may cause the user viewing the image to feel that something is wrong.

SUMMARY

An advantage of some aspects of the invention is that a missing pixel in an image, if any, is automatically interpolated, thus restraining the influence of the missing. Another advantage is that the missing pixel is highlighted so that the user can easily notice the missing, thus reducing the time to restore the image.

An image display device according to an aspect of the invention includes: an image input unit having a plurality of channels; a generation unit which processes input data inputted to each of the plurality of channels and generates display image data for displaying an image of one frame; and a detection unit which detects a missing of input data on each of the channels. If a missing of input data is detected by the detection unit, the generation unit executes interpolation processing to interpolate and generate an image feature quantity of an unset pixel which is a pixel forming the display image data and whose image feature quantity cannot be set due to the missing of input data, based on the input data on the other channels where a missing of input data is not detected. In the interpolation processing, the image feature quantity of the unset pixel is interpolated with an image feature quantity of a reference pixel selected from pixels other than the unset pixel.

In this configuration, the image feature quantity of an unset pixel is interpolated with the image feature quantity of a reference pixel selected from pixels other than the unset pixel. Thus, even if there is a channel where input data is missing, the influence of the missing of input data can be restrained.

In the aspect of the invention, the generation unit may select, as the reference pixel, a pixel whose luminance value as the image feature quantity is already set by the input data on the other channels, then find a reference luminance value based on the luminance value of the selected reference pixel, and set a luminance value of the unset pixel, based on the reference luminance value.

In this configuration, the reference pixel is selected from pixels whose luminance value is already set, and the luminance value of the unset pixel is set, based on the luminance value of the selected reference pixel. Thus, the luminance value of the unset pixel can be set, based on the luminance value of a pixel whose luminance value is already set. Also, the channel to select the reference pixel can be selected arbitrarily.

In the aspect of the invention, the generation unit may select, as the reference pixel, an adjacent pixel which is adjacent to the unset pixel and whose luminance value as the image feature quantity is already set by the input data on the other channels.

In this configuration, an adjacent pixel whose luminance value is already set is selected as the reference pixel. Thus, the luminance value of the unset pixel can be set, based on the luminance value of the adjacent pixel whose luminance value is already set.

In the aspect of the invention, the generation unit may select, as the reference pixel, a plurality of pixels whose luminance value as the image feature quantity is already set by the input data on the other channels, and find an average value of the luminance values of the plurality of reference pixels thus selected, as the reference luminance value.

In this configuration, a plurality of pixels whose luminance value is set is selected as the reference pixel. Thus, the luminance value of the unset pixel can be set, based on the average value of the luminance values of the plurality of reference pixels whose luminance value is already set.

In the aspect of the invention, the generation unit may set the luminance value of the unset pixel to a luminance value resulting from adding a preset amount of shift to the reference luminance value.

In this configuration, a luminance value resulting from adding a preset amount of shift to the reference luminance value is set as the luminance value of the unset pixel. Thus, the luminance value of the unset pixel can be set to a value shifted from the reference luminance value by the amount of shift.

In the aspect of the invention, the generation unit may select the luminance value of the unset pixel from a range decided by the reference luminance value and a luminance value resulting from adding a preset amount of shift to the reference luminance value.

In this configuration, a value selected from a range decided by the reference luminance value and a luminance value resulting from adding an amount of shift to the reference luminance value can be set as the luminance value of the unset pixel.

In the aspect of the invention, the image display device may include an operation unit which accepts an operation, and the generation unit may select one of the reference luminance value and a luminance value resulting from adding a preset amount of shift to the reference luminance value, according to an operation accepted by the operation unit.

In this configuration, one of the reference luminance value and a luminance value resulting from adding a preset amount of shift to the reference luminance value can be selected as the luminance value of the unset pixel, according to a selection made by the user.

In the aspect of the invention, the image display device may include a notification unit which carries out notification, and if a missing of input data is detected by the detection unit, the notification unit may notify information of the channel where the missing is detected.

In this configuration, a missing of input data can be notified.

Another aspect of the invention is directed to a method for controlling an image display device having an image input unit having a plurality of channels, including: processing input data inputted to each of the plurality of channels and generating display image data for displaying an image of one frame; and detecting a missing of input data on each of the channels. In the generating, if a missing of input data is detected by the detecting, interpolation processing to interpolate and generate an image feature quantity of an unset pixel which is a pixel forming the display image data and whose image feature quantity cannot be set due to the missing of input data, based on the input data on the other channels where a missing of input data is not detected, is executed. In the interpolation processing, the image feature quantity of the unset pixel is interpolated with an image feature quantity of a reference pixel selected from pixels other than the unset pixel.

In this configuration, the image feature quantity of an unset pixel is interpolated with the image feature quantity of a reference pixel selected from pixels other than the unset pixel. Thus, even if there is a channel where input data is missing, the influence of the missing of input data can be restrained.

BRIEF DESCRIPTION OF THE DRAWINGS

The invention will be described with reference to the accompanying drawings, wherein like numbers reference like elements.

FIG. 2 shows image data supplied from the image supply device to a projector.

FIG. 4 shows pixel data loaded on a frame memory.

DESCRIPTION OF EXEMPLARY EMBODIMENTS

Figure 1:
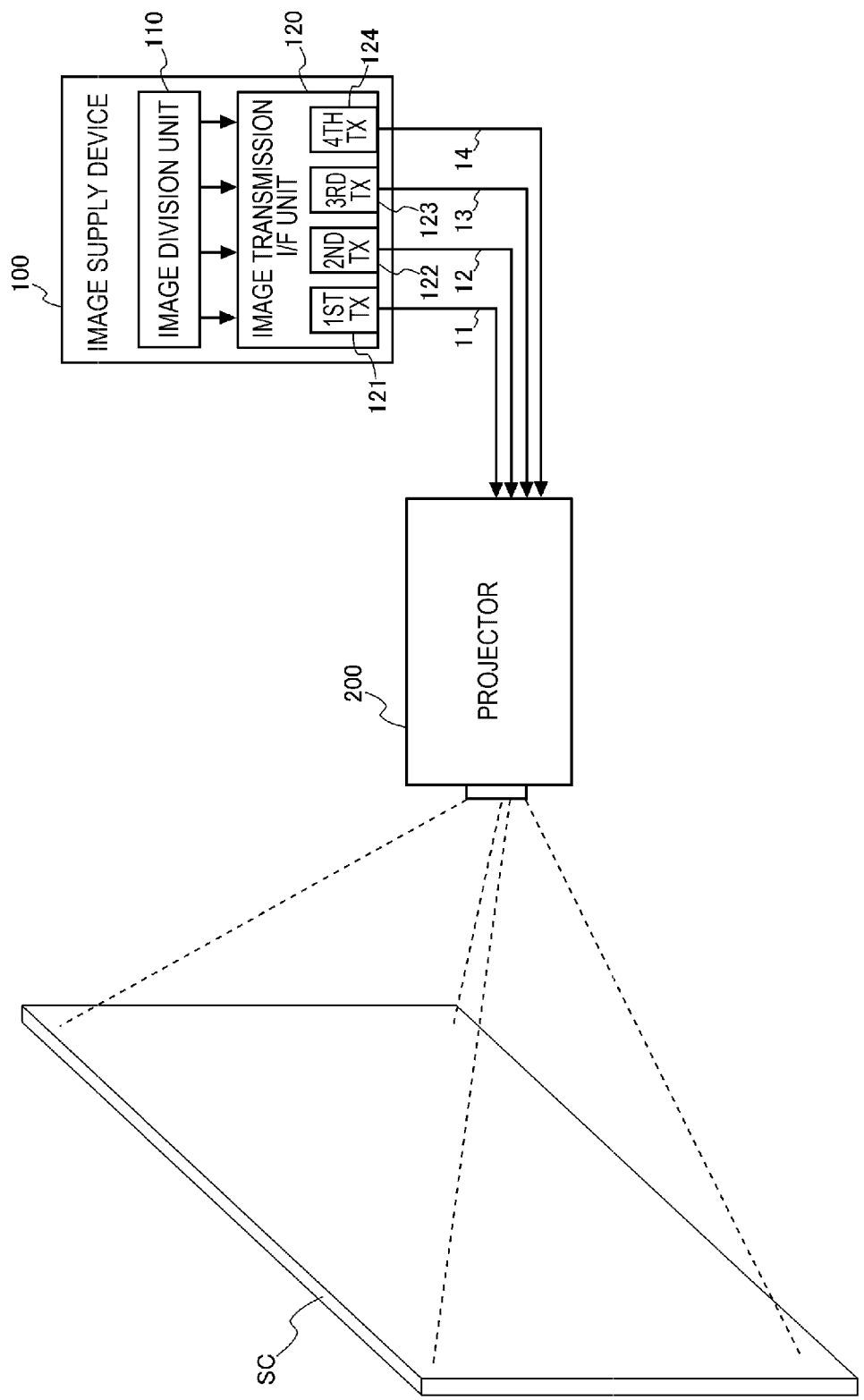
FIG. 1 shows a system configuration.

FIG. 1 shows a system configuration according to an embodiment.

The system according to this embodiment has an image supply device 100 which supplies image data, and a projector 200 which projects supplied image data onto a projection surface. The projector 200 operates as the "image display device" according to the invention.

The image supply device 100 and the projector 200 are connected through a plurality of channels. The image supply device 100 divides image data for displaying an image of one frame into a plurality of segments, allocates the divided image data respectively to the plurality of channels, and transmits the divided image data to the projector 200. An image of one frame is equivalent to an image of one cut (frame). For example, if the frequency of a vertical scanning signal of image data on which the image is based is 60 Hz, the image is projected by the projector 200 during one period of the frequency, that is, 16.67 milliseconds.

A channel is a transmission path used to transmit and receive data and includes a cable, a connector for connecting the cable, an interface circuit corresponding to the connector, and the like. In this embodiment, the case where the image supply device 100 and the projector 200 are connected to each other via four channels is described as an example. However, the number of channels is arbitrary. The image supply device 100 and the projector 200 are connected to each other via cables 11, 12, 13, and 14.

The image supply device 100 has an image division unit 110 and an image transmission I/F unit 120. The image transmission I/F unit 120 has a first transmitting unit 121, a second transmitting unit 122, a third transmitting unit 123, and a fourth transmitting unit 124. In this embodiment, the first transmitting unit 121 corresponds to a first channel. The second transmitting unit 122 corresponds to a second channel. The third transmitting unit 123 corresponds to a third channel. The fourth transmitting unit 124 corresponds to a fourth channel. In FIG. 1, the first transmitting unit 121 is described as "1st Tx" and the second transmitting unit 122 is described as "2nd Tx". Also, in FIG. 1, the third transmitting unit 123 is described as "3rd Tx" and the fourth transmitting unit 124 is described as "4th Tx".

Data of a dynamic image or still image is inputted to the image division unit 110 from a superordinate device, not illustrated. The data of a dynamic image or still image is hereinafter referred to as image data. The image data may be data recorded on a recording medium such as a DVD or Blu-ray (trademark registered) disc, or may be data read out from a storage unit such as a hard disk device (none of these is illustrated).

The image division unit 110 divides the inputted image data into a plurality of segments. In this embodiment, the image division unit 110 allocates data of each pixel forming the image data to one of the four channels and thus divides one frame of the image data into four segments. The data of a pixel includes data representing a luminance value (Y) and color difference information (Cb, Cr). The data of a pixel is hereinafter referred to as pixel data. The data representing a luminance value (Y) is equivalent to the "image feature quantity" according to the invention.

FIG. 2 shows image data supplied from the image supply device 100 to the projector 200 and shows pixel data arranged in the form of a matrix.

The image division unit 110 allocates pixel data in one line of the image data to two channels.

In FIG. 2, pixels in the first row of the image data are referred to pixels in the first line. Pixels in the second row are referred to as pixels in the second line. Similarly, pixels in the subsequent rows are referred to as pixels in the third line, pixels in the fourth line, and so forth. FIG. 2 shows pixels in the first to eighth lines.

The image division unit 110 allocates two successive pixels in the same line to the same channel.

For example, the image division unit 110 allocates the pixel data of the first (left end) and second pixels from the left, that is, two pixels, in the first line, to the first channel. In FIG. 2, "CH1" indicates the first channel. The image division unit 110 allocates the pixel data of the third and fourth pixels from the left in the first line, to the second channel. In FIG. 2, "CH2" indicates the second channel. The image division unit 110 allocates the pixel data of the fifth and sixth pixels from the left in the first line, to the first channel. In this way, the image division unit 110 allocates two pixels each, of the pixels in the first line, alternately to the first channel and the second channel.

The image division unit 110 allocates the pixel data of the first (left end) and second pixels from the left, that is, two pixels, in the second line, to the third channel. In FIG. 2, "CH3" indicates the third channel. The image division unit 110 allocates the pixel data of the third and fourth pixels from the left in the second line, to the fourth channel. In FIG. 2, "CH4" indicates the fourth channel. The image division unit 110 allocates the pixel data of the fifth and sixth pixels from the left in the second line, to the third channel. In this way, the image division unit 110 allocates two pixels each, of the pixels in the second line, alternately to the third channel and the fourth channel.

The image division unit 110 processing each of the third and subsequent lines similarly to the first and second lines and allocates the pixel data of one frame one of the first to fourth channels.

The image division unit 110 outputs the pixel data allocated to each channel to a transmitting unit corresponding to the allocated channel in the image transmission I/F unit 120 (one of the first transmitting unit 121, the second transmitting unit 122, the third transmitting unit 123, and the fourth transmitting unit 124).

The first transmitting unit 121 has an interface circuit and a connector (neither of which is illustrated). The cable 11 is connected to the connector. The first transmitting unit 121 adds a synchronization signal and additional information to pixel data inputted from the image division unit 110 and also converts the resulting pixel data into a signal conforming to the communication standard of the image transmission I/F unit 120 (hereinafter referred to as image signal). The first transmitting unit 121 outputs the converted image signal to the cable 11. The synchronization signal includes, for example, a line number, a signal indicating the timing of starting a period when the pixel is enabled, a signal indicating the timing of ending the period when the pixel is enabled, an error detection code, a horizontal blanking signal, and the like. The additional information includes identification information which identifies the channel. For example, the identification information which identifies the channel may be included in a payload ID. The payload ID includes information about the format of a dynamic image that is recorded and transmitted, such as the frame rate, resolution, bit depth, and signal configuration, in addition to the identification information which identifies the channel.

The second transmitting unit 122, the third transmitting unit 123, and the fourth transmitting unit 124 have an interface circuit and a connector (neither of which is illustrated), similarly to the first transmitting unit 121. The cable 12 is connected to the connector of the second transmitting unit 122. The cable 13 is connected to the connector of the third transmitting unit 123. The cable 14 is connected to the fourth transmitting unit 124.

The second transmitting unit 122, the third transmitting unit 123, and the fourth transmitting unit 124 add a synchronization signal and identification information which identifies the channel to pixel data inputted from the image division unit 110, and also convert the resulting pixel data into an image signal. The second transmitting unit 122, the third transmitting unit 123, and the fourth transmitting unit 124 output the converted image signal to the cables 12, 13, and 14.

Figure 3:
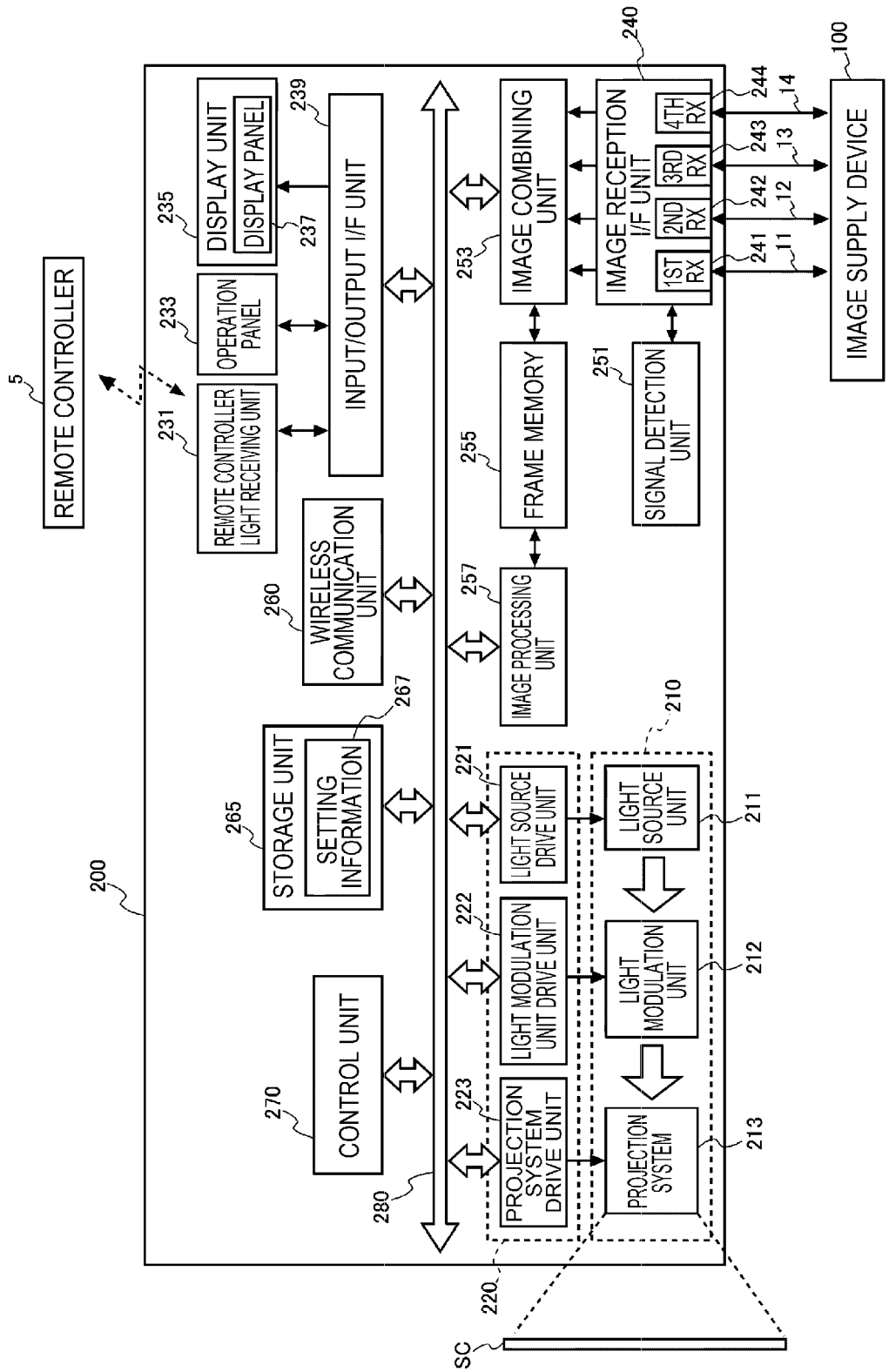
FIG. 3 shows the configuration of the projector.

FIG. 3 is a block diagram showing the configuration of the projector 200.

The projector 200 is a device which generates a projection image and projects the projection image onto a projection surface. The projection image can be generated based on image data supplied from the image supply device 100 and can also be generated based on image data stored in advance in a storage unit 265 (see FIG. 3) provided in the projector 200.

The projection surface onto which the projector 200 projects the projection image may be a flat surface, a curved surface, or a rugged surface. In this embodiment, the case where an image is projected on a screen SC with a flat surface is described. The screen SC may utilize a fixed flat surface such as a wall surface or may be a suspended or stand-up curtain-like screen.

The projector 200 has an image reception interface unit (hereinafter simply referred to as image reception I/F unit) 240. The image reception I/F unit 240 has a first receiving unit 241, a second receiving unit 242, a third receiving unit 243, and a fourth receiving unit 244. In FIG. 3, the first receiving unit 241 is described as "1st Rx", the second receiving unit 242 is described as "2nd Rx", the third receiving unit 243 is described as "3rd Rx", and the fourth receiving unit 244 is described as "4th Rx". The image reception I/F unit operates as the "image input unit" according to the invention.

Each of the first receiving unit 241, the second receiving unit 242, the third receiving unit 243, and the fourth receiving unit 244 has a connector and an interface circuit corresponding to the connector (neither of which is illustrated). The connector of the first receiving unit 241 is connected to the cable 11. The connector of the second receiving unit 242 is connected to the cable 12. The connector of the third receiving unit 243 is connected to the cable 13. The connector of the fourth receiving unit 244 is connected to the cable 14. The first receiving unit 241 corresponds to the first channel. The second receiving unit 242 corresponds to the second channel. The third receiving unit 243 corresponds to the third channel. The fourth receiving unit 244 corresponds to the fourth channel.

The interface that can be employed as the image transmission I/F unit 120 and the image reception I/F unit 240 can be, for example, HD-SDI, 3G-SDI, Dual-Link HD-SDI, Quad-Link 3G SDI, HDMI (trademark registered), Display Port, or the like. The image transmission I/F unit 120 and the image reception I/F unit 240 in this embodiment have a standard corresponding to Quad-Link 3G-SDI.

The first receiving unit 241 receives an image signal via the cable 11 and takes out header information and pixel data from the received image signal. The pixel data is equivalent to the "input data" according to the invention. The first receiving unit 241 outputs the extracted header information and pixel data to an image combining unit 253. The first receiving unit 241 also outputs the extracted header information to a signal detection unit 251. The second receiving unit 242, the third receiving unit 243, and the fourth receiving unit 244 operate similarly to the first receiving unit 241.

The signal detection unit 251 operates as the "detection unit" according to the invention. To the signal detection unit 251, the header information is inputted from the first receiving unit 241, the second receiving unit 242, the third receiving unit 243, and the fourth receiving unit 244. The signal detection unit 251 detects a channel on which an image signal is not received, based on the inputted header information.

The signal detection unit 251 may include one or more dedicated circuits or may include one or more processors.

First, the signal detection unit 251 detects a channel on which an image signal is received, based on the header information. After detecting a channel on which an image signal is received, the signal detection unit 251 determines whether an image signal is received on all the four channels or not. If an image signal is not received on all the four channels, the signal detection unit 251 detects a channel on which an image signal is not received. That is, the signal detection unit 251 detects a channel to which header information is not inputted, as a channel on which an image signal is not received. After detecting a channel on which an image signal is not received, the signal detection unit 251 outputs information of the detected channel to a control unit 270.

The signal detection unit 251 may monitor the signal reception states of the first receiving unit 241, the second receiving unit 242, the third receiving unit 243, and the fourth receiving unit 244, then detect a receiving unit which has not received an image signal, and output the result of the detection to the control unit 270.

To the image combining unit 253, the header information and the pixel data are inputted from the first receiving unit 241, the second receiving unit 242, the third receiving unit 243, and the fourth receiving unit 244. The image combining unit 253 loads the pixel data received by the first receiving unit 241 to the fourth receiving unit 244 onto a frame memory 255, referring to the header information, and generates image data for one frame. In this process, the image combining unit 253 converts the pixel data into the format of R (red), G (green), B (blue), based on the luminance value (Y) and the color difference information (Cb, Cr) included in the pixel data, and stores the RGB value and the luminance value (Y) onto the frame memory 255.

If there is a channel on which an image signal cannot be received, the data volume of the pixel data loaded in the frame memory 255 is smaller than that of pixel data for one frame.

The frame memory 255 has a plurality of banks. Each bank has a storage capacity to write one frame of image data. The frame memory 255 is made up of, for example, an SDRAM (synchronous dynamic random access memory). The SDRAM is a DRAM on which data is read and written synchronously with a clock.

In this embodiment, the case where the projector 200 has the frame memory 255 storing pixel data for one frame is described. However, a line buffer which stores pixel data for one line may be provided instead of the frame memory 255.

An image processing unit 257, along with the control unit 270, operates as the "generation unit" according to the invention. The image processing unit 257 carries out processing on the pixel data loaded on the frame memory 255, such as resolution conversion (scaling) or resizing, correction of distortion, shape correction, digital zoom, or adjustment of the color tone or luminance of the image. The image processing unit 257 can also execute a combination of a plurality of processes from among the above processes.

The image processing unit 257 has a CPU, a ROM, and a RAM (none of which is illustrated), as hardware. The ROM is a non-volatile storage device and stores a control program and data. The RAM is used as a work area for the CPU. The CPU loads a program read out from the ROM or the storage unit 265 onto the RAM, executes the loaded program, and thus executes the functions of the image processing unit 257.

In this embodiment, the image processing unit 257 has one processor (CPU) and this processor executes processing according to a program, thus implementing the functions of the image processing unit 257. The functions of the image processing unit 257 may be implemented by a plurality of processors or may be implemented by one or more dedicated circuits. For example, the image processing unit 257 may include one or more SoC (system on a chip), MCU (micro control unit), FPGA (field-programmable gate array).

If a missing of pixel data is detected on one of the first to fourth channels, the image processing unit 257 executes interpolation processing under the control of the control unit 270 and generates pixel data for the channel on which pixel data is missing. Specifically, the image processing unit 257 interpolates pixel data of a pixel which forms the image data and whose value cannot be set due to the missing (hereinafter referred to as unset pixel), based on the pixel data on the other channels where a missing of pixel data is not detected. Details of the interpolation processing will be described later. After finishing the image processing, the image processing unit 257 reads out the pixel data loaded on the frame memory 255 and outputs the pixel data as display image data to a light modulation unit drive unit 222.

The projector 200 has a projection unit 210 which projects an optical image onto the screen SC, and a drive unit 220 which drives the projection unit 210. The projection unit 210 has a light source unit 211, a light modulation unit 212, and a projection system 213. The drive unit 220 has a light source drive unit 221, the light modulation unit drive unit 222, and a projection system drive unit 223.

The light source unit 211 has a light source made up of a xenon lamp, ultra-high-pressure mercury lamp, LED (light-emitting diode), or laser light source or the like. The light source unit 211 may have a reflector and an auxiliary reflector which guide light emitted from the light source to the light modulation unit 212. The light source unit 211 may also have a lens group and a polarizer to improve optical characteristics of projection light, or a light adjustment element which reduces the amount of light of the light emitted from the light source on the path to the light modulation unit 212, or the like (none of which is illustrated).

The light source drive unit 221 is connected to the light source unit 211 and a bus 280 and causes the light source unit 211 to turn on or off under the control of the control unit 270, which is similarly connected to the bus 280.

The light modulation unit 212 has three liquid crystal panels corresponding to the primary colors of RGB. The light emitted from the light source unit 211 is separated into three color lights of RGB by an optical system, not illustrated, and each becomes incident on the corresponding liquid crystal panel. The three liquid crystal panels are transmission-type liquid crystal panels. The color lights are transmitted through the liquid crystal panels and thus modulated to generate image lights. The image lights resulting from the transmission and modulation through the respective liquid crystal panels are combined together by a combining system such as a cross dichroic prism and then emitted to the projection system 213.

The light modulation unit drive unit 222 is connected to the light modulation unit 212 and the bus 280 and draws an image on each liquid crystal panel of the light modulation unit 212 under the control of the control unit 270.

The light modulation unit drive unit 222 generates a drive signal for each of R, G, B, based on display image data inputted from the image processing unit 257. Based on the R, G, B drive signals thus generated, the light modulation unit drive unit 222 drives the corresponding liquid crystal panels of the light modulation unit 212 and draws an image on each liquid crystal panel.

The projection system 213 has a projection lens (not illustrated) which projects the image light modulated by the light modulation unit 212 into the direction the screen SC and thus forms an image on the screen SC. The projection lens is a zoom lens having the function of adjusting the angle of view, that is, adjusting the size of a projected image (zoom adjustment). The projection lens also has the function of focus adjustment, which is the adjustment of the focal position.

The projection system drive unit 223 has a motor which drives the projection system 213 and is connected to the projection system 213 and the bus 280. The projection system drive unit 223 drives the motor under the control of the control unit 270, thus adjusting the lens position of the projection lens and adjusting zoom and focus.

The projector 200 has a remote controller light receiving unit 231, an operation panel 233, a display unit 235, and an input/output I/F unit 239.

The remote controller light receiving unit 231 receives an infrared signal transmitted from a remote controller 5 and outputs the infrared signal to the input/output I/F unit 239. The remote controller 5, which is operated by a user, has various buttons and transmits an infrared signal corresponding to a button operation by the user. The remote controller 5 operates as the "operation unit" according to the invention. The input/output I/F unit 239 decodes the infrared signal received by the remote controller light receiving unit 231, generates an operation signal representing the content of the operation on the remote controller 5, and outputs the operation signal to the control unit 270.

The operation panel 233 is provided with various operation keys. The operation keys includes, for example, a power key to turn on and off the power supply of the projector 200, and a menu key to perform various settings, or the like. On accepting an operation on an operation key, the operation panel 233 outputs an operation signal corresponding to the operation key on which the operation is accepted, to the control unit 270. The operation panel 233 operates as the "operation unit" according to the invention.

The display unit 235 has a display panel 237. As the display panel 237, for example, an LCD (liquid crystal display) can be used. The display unit 235 causes the display panel 237 to display various screens under the control of the control unit 270. The display panel 237 is provided, for example, on a lateral surface of the main body of the projector 200. The display unit 235 and the control unit 270 operate as the "notification unit" according to the invention.

The projector 200 has a wireless communication unit 260. The wireless communication unit 260 is connected to the bus 280 and operates under the control of the control unit 270.

The wireless communication unit 260 has an antenna and an RF (radio frequency) circuit or the like, not illustrated, and executes wireless communication with an external device under the control of the control unit 270. As a wireless communication method, the wireless communication unit 260 can employ a short-range wireless communication method such as wireless LAN (local area network), Bluetooth (trademark registered), UWB (ultra-wideband), or infrared communication. Also, the wireless communication unit 260 may employ a wireless communication method utilizing a mobile phone network.

The projector 200 has an image processing system. This image processing system is mainly made up of the control unit 270, which comprehensively control the entirety of the projector 200. The image processing system also has the image combining unit 253, the image processing unit 257, the frame memory 255, and the storage unit 265.

The storage unit 265 is an auxiliary storage device such as a hard disk device. The storage unit 265 may instead be DRAM (dynamic RAM), a flash memory capable of storing a large volume of information, or an optical disc such as CD (compact disc), DVD (digital versatile disc) or BD (Blu-ray (trademark registered) disc). The storage unit 265 stores a control program executed by the control unit 270 and various data such as a parameter used for the image processing executed by the image processing unit 257.

The storage unit 265 also stores setting information 267. The setting information 267 is information to set an operation of the image processing unit 257. The setting information 267 includes, for example, information to set the operation of interpolation processing to be executed by the image processing unit 257 if a channel where pixel data is missing is detected. The setting information 267 is information that can be changed by the user operating the operation panel 233 or the remote controller 5.

The control unit 270, along with the image processing unit 257, operates as the "generation unit" according to the invention. The control unit 270 has a CPU, a ROM, and a RAM (none of which is illustrated), as hardware. The ROM is a non-volatile storage device and stores a control program and data. The RAM is used as a work area for the CPU. The CPU loads the control program read out from the ROM or the storage unit 265 onto the RAM, executes the loaded control program, controls each part of the projector 200, and thus executes the functions of the control unit 270.

In this embodiment, the control unit 270 has one processor (CPU) and this processor executes processing according to the control program, thus implementing the functions of the control unit 270. However, the functions of the control unit 270 may be implemented by a plurality of processors or semiconductor chips. For example, the control unit 270 may also have a co-processor such as a SoC (system on a chip), MCU (micro control unit), or FPGA (field-programmable gate array). The control unit 270 may have the CPU and the co-processor collaborate with each other or may selectively use one of these processors, to perform various kinds of control.

The control unit 270 controls the drive unit 220 and thus causes the projection unit 210 to project a projection image. Specifically, the control unit 270 controls the light source drive unit 221 to turn on or off the light source of the light source unit 211 and also adjust the luminance of the light source. The control unit 270 also controls the light modulation unit drive unit 222 to draw an image of the liquid crystal panels of the light modulation unit 212. The control unit 270 also controls the projection system drive unit 223 to adjust the zoom and focus of the projection lens. Thus, the light emitted from the light source unit 211 is transmitted through the liquid crystal panels of the light modulation unit 212 and thus modulated to generate image light, and the generated image light is projected as a projection image onto the screen SC by the projection system 213.

The control unit 270 also causes the image processing unit 257 to execute image processing and thus to process image data. In this process, the control unit 270 reads out a necessary parameter for the image processing from the storage unit 265 and outputs the parameter to the image processing unit 257.

If information of a channel where an image signal is not received is inputted to the control unit 270 from the signal detection unit 251, the control unit 270 causes the image processing unit 257 to execute interpolation processing.

Operations of the control unit 270 and the image processing unit 257 will be described more in detail.

If information of a channel where an image signal is not received is inputted to the control unit 270 from the signal detection unit 251, the control unit 270 reads out the setting information 267 from the storage unit 265 and outputs the setting information 267 along with an instruction to execute interpolation processing, to the image processing unit 257.

The setting information 267 represents a setting of interpolation processing, which is a first setting or a second setting. If the setting information 267 inputted from the control unit 270 is the first setting, the image processing unit 257 selects, as reference pixels, pixels which are adjacent to the unset pixel (hereinafter referred to as adjacent pixels) and whose pixel data is already set. The image processing unit 257 sets pixel data of the unset pixel, based on the average value of the pixel data of the selected reference pixels.

FIG. 4 shows the pixel data loaded on the frame memory 255. Particularly, FIG. 4 shows the state where the image signal on the second channel is missing and where the pixel data of the pixels corresponding to the second channel is missing. In FIG. 4, the pixels that are not hatched represent pixels whose pixel data is missing.

For example, the pixel in the first row and the third column shown in FIG. 4 is a pixel corresponding to the second channel and is therefore an unset pixel. In this case, the image processing unit 257 selects the pixels in the first row and the second column, the second row and the second column, and the second row and the third column, as reference pixels, and acquires the luminance values (Y) of the selected pixels. The image processing unit 257 finds the average value of the acquired luminance values (Y) and sets the average value of the luminance values (Y) thus found, as the luminance value (Y) of the pixel in the first row and the third column, which is an unset pixel. The average value of the luminance values (Y) of the selected reference pixels is equivalent to the "reference luminance value" according to the invention.

Next, the case where the setting of the setting information 267 is the second setting is described.

If the setting of the setting information 267 inputted from the control unit 270 is the second setting, the image processing unit 257 similarly sets adjacent pixels adjacent to the unset pixel as reference pixels and finds the average value of the pixel data of the reference pixels. The image processing unit 257 sets pixel data of the unset pixel, based on a value resulting from adding or subtracting an amount of shift to or from the average value thus found.

For example, if the pixel in the first row and the third column shown in FIG. 4 is an unset pixel, the image processing unit 257 selects the pixels in the first row and the second column, the second row and the second column, and the second row and the third column, as reference pixels, and acquires the luminance values (Y) of the selected pixels. The image processing unit 257 finds the average value of the acquired luminance values (Y) of the pixels and sets a value resulting from adding or subtracting a preset amount of shift to or from the average value thus found, as the luminance value (Y) of the pixel in the first row and the third column, which is an unset pixel.

In this process, the image processing unit 257 may subtract an amount of shift if the average value of the luminance values (Y) thus found is equal to or greater than a preset value, and may add the amount of shift if the average value is smaller than the preset value. For example, if the range of the luminance Y is $0 \leq Y \leq 255$ and the average value of the luminance values Y of the reference pixels is 128 or greater, the image processing unit 257 sets a value resulting from subtracting a preset amount of shift from the average value of the luminance values Y, as the luminance value (Y) of the unset pixel. If the average value of the luminance values Y of the reference pixels is smaller than 128, the image processing unit 257 sets a value resulting from adding the preset amount of shift to the average value of the luminance values Y, as the luminance value (Y) of the unset pixel.

The image processing unit 257 may also select the luminance value (Y) of the unset pixel from a range decided by the average value of the luminance values (Y) of the reference pixels and the value resulting from adding the amount of shift to the average value.

For example, selecting a value close to the average value of the luminance values (Y) of the reference pixels, as the luminance value (Y) of the unset pixel, can make the missing of the pixel data unnoticeable to the user. Meanwhile, selecting a value close to the value resulting from adding the amount of shift to the average value of the luminance values (Y) of the reference pixels, as the luminance value (Y) of the unset pixel, can make the missing of the pixel data noticeable to the user. The image processing unit 257 selects the luminance value (Y) of the unset pixel according to an instruction inputted from the control unit 270. The control unit 270 causes the image processing unit 257 to select the luminance value (Y) of the unset pixel, according to information that is set in advance by the user operating the operation panel 233.

If the setting of the setting information 267 is the second setting, a value resulting from adding a preset amount of shift to the average value of the pixel data of the adjacent pixels is set as the pixel data of the unset pixel. Therefore, if the luminance values of the adjacent pixels are small, the luminance value of the unset pixel is set to a large value. Meanwhile, if the luminance values of the adjacent pixels are large, the luminance value of the unset pixel is set to a small value. Thus, it is possible to make the user recognize that there is a channel where pixel data is missing, when a projection image is projected on the screen SC.

In the above description, the adjacent pixels adjacent to the unset pixel are selected as reference pixels. However, pixels that can be selected as reference pixels are not limited to the adjacent pixels.

For example, the pixel data loaded on the frame memory 255, that is, all the pixel data on the channels where a missing is not detected may be set as reference pixels.

Figure 5:
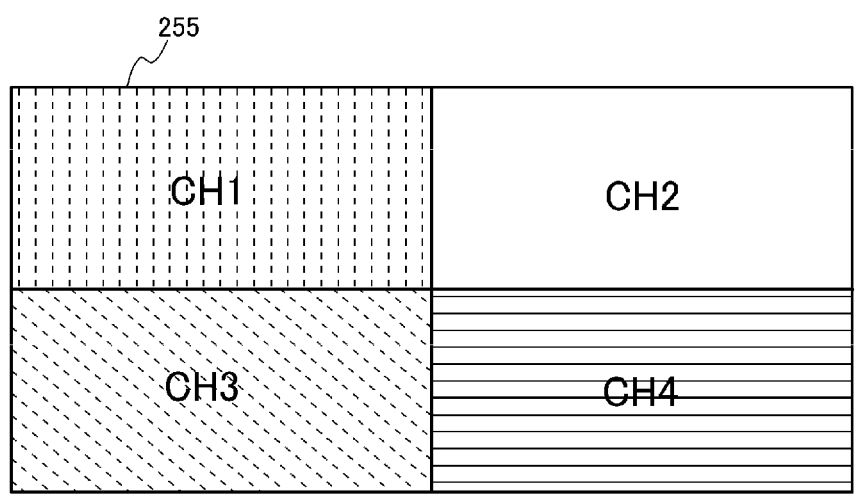
FIG. 5 shows pixel data loaded on a frame memory.

FIG. 5 shows the pixel data loaded on the frame memory. Particularly in FIG. 5, there is no missing of pixel data on the first channel, the third channel, and the fourth channel, which are hatched, whereas pixel data is missing on the second channel.

The image supply device 100 divides one frame of image data into four equally sized areas, that is, top left area, top right area, bottom left area, and bottom right area. The image supply device 100 transmits the pixel data to the projector 200, allocating the pixel data in the top left area thus divided to the first channel, the pixel data in the top right area to the second channel, the pixel data in the bottom left area to the third channel, and the pixel data in the bottom right area to the fourth channel.

It is now assumed that, in the transmission of the image signal from the image supply device 100 to the projector 200, the pixel data in the top right area allocated to the second channel is missing. In this case, the control unit 270 sets, as reference pixels, the pixel data on the first channel, the third channel, and the fourth channel, through which the pixel data is received without any missing of the pixel data. Thus, of the pixel data for one frame, all the pixel data on the channels where the pixel data is not missing are set as reference pixels. This enables setting a value close to the APL (average picture level) as the pixel data of the unset pixel.

Also, pixels within a predetermined range from the unset pixel may be set as reference pixels.

For example, a pixel spaced apart from the pixel position of the unset pixel by a preset number of pixels (for example, 10 pixels or 20 pixels), and pixels situated to the inner side of this pixel (pixels closer to the unset pixel), may be set as reference pixels.

Figure 6:
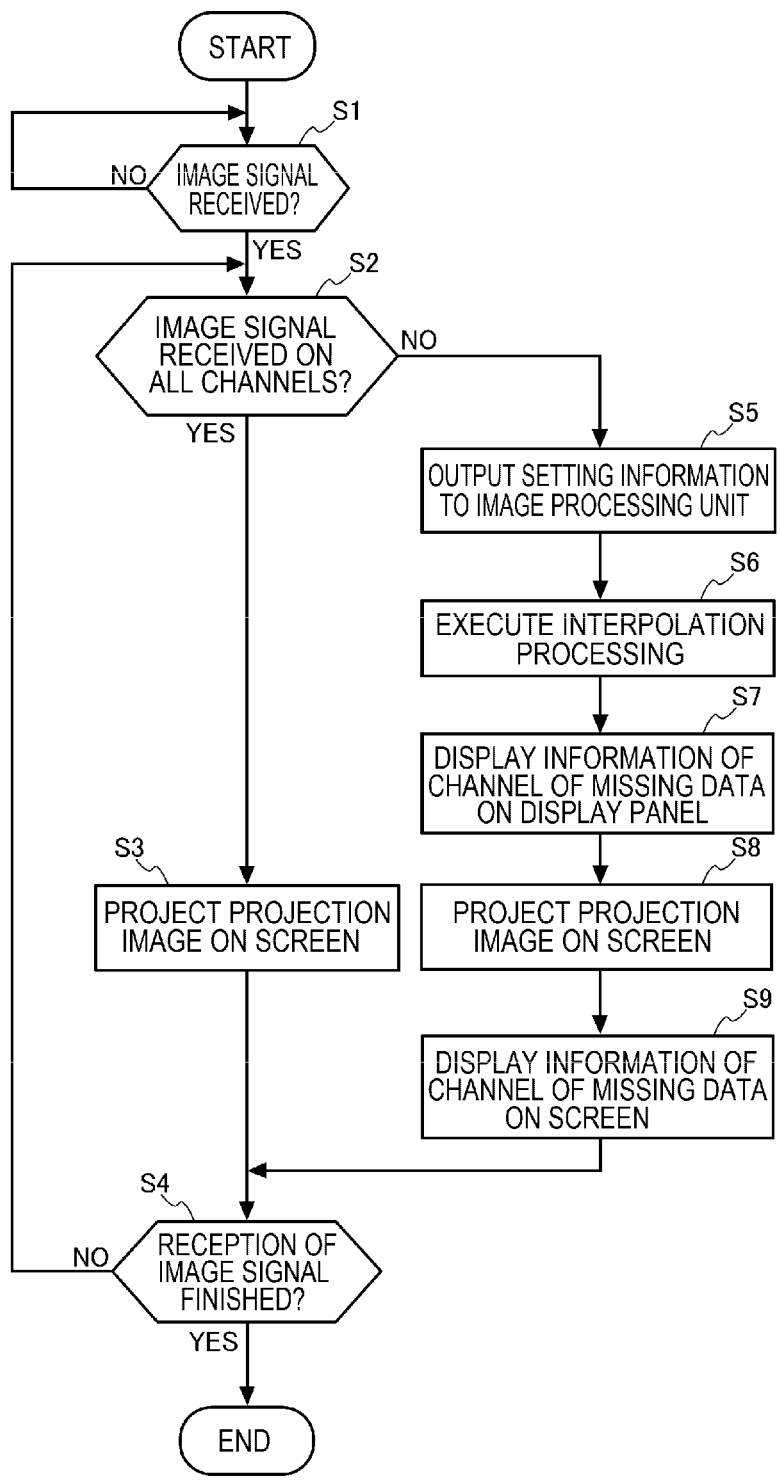
FIG. 6 is a flowchart showing operations of the projector.

FIG. 6 is a flowchart showing operations of the projector 200.

First, the control unit 270 determines whether an image signal is received by one of the first receiving unit 241, the second receiving unit 242, the third receiving unit 243, and the fourth receiving unit 244 or not (step S1). If no image signal is received (NO in step S1), the control unit 270 waits to start processing until an image signal is received. If an image signal is received (YES in step S1), the control unit 270 determines whether an image signal is received on all of the first to fourth channels or not (step S2). Step S2 is equivalent to the "detecting" according to the invention. If an image signal is received on all the channels (YES in step S2), the control unit 270 loads pixel data extracted from the received image signal onto the frame memory 255 and causes the image processing unit 257 to process the loaded pixel data. The image processing unit 257 executes image processing, reads out the processed pixel data from the frame memory 255, and outputs the pixel data as display image data to the light modulation unit drive unit 222 of the drive unit 220.

The light modulation unit drive unit 222 generates a drive signal for each of R, G, B, based on the display image data inputted from the image processing unit 257, drives the liquid crystal panels of the light modulation unit 212, based on the generated drive signal, and draws an image on each liquid crystal panel. Thus, the light emitted from the light source unit 211 is transmitted through the light modulation unit 212 and thus modulated into image light, and the modulated image light is projected as a projection image onto the screen SC (step S3).

If information of a channel where an image signal is not received is inputted to the control unit 270 from the signal detection unit 251, the control unit 270 determines that an image signal is not received on all the channels (NO in step S2). In this case, the control unit 270 reads out the setting information 267 from the storage unit 265 and outputs an instruction to execute interpolation processing and the setting information 267 to the image processing unit 257 (step S5). The image processing unit 257 carries out interpolation processing according to the setting information 267 inputted from the control unit 270 (step S6). Step S6 is equivalent to the "generating" according to the invention.

If the inputted setting information 267 is the first setting, the image processing unit 257 finds the average value of the pixel data of the adjacent pixels adjacent to the unset pixel. The image processing unit 257 also sets the average value of the pixel data of the adjacent pixels thus found, as the pixel data of the unset pixel.

If the inputted setting information 267 is the second setting, the image processing unit 257 finds the average value of the pixel data of the adjacent pixels adjacent to the unset pixel. The image processing unit 257 also adds a preset amount of shift to the average value thus found, and sets the pixel data with the amount of shift added, as the pixel data of the unset pixel.

Next, the control unit 270 outputs information of a channel where a missing of pixel data is detected, to the display unit 235. The display unit 235 causes the display panel 237 to display the information of the channel where a missing of pixel data is detected, under the control of the control unit 270 (step S7).

Next, on completion of the interpolation processing, the control unit 270 controls the image processing unit 257 and the drive unit 220 to display an image on the screen SC (step S8). The image processing unit 257 completes the interpolation processing, reads out pixel data from the frame memory 255, where pixel data for one frame is loaded, and outputs the read-out pixel data as display image data to the light modulation unit drive unit 222 of the drive unit 220. Thus, image light based on the display image data is projected as a projection image onto the screen SC (step S8).

The control unit 270 also generated image data representing the channel where a missing of pixel data is detected, and outputs the image data to the image processing unit 257.

The image processing unit 257 superimposes and loads the pixel data inputted from the control unit 270 onto the frame memory 255, where the pixel data received from the image supply device 100 is already loaded. The loading position of the image data representing the channel of missing data may be the center of the frame memory 255 in order to make the display of the channel of missing data noticeable. This image data may also be loaded on the frame memory 255 in such a way that, when projected on the screen SC, the channel of missing data is placed at one of the top, bottom, left and right ends of the screen SC.

The image processing unit 257 reads out the data loaded on the frame memory 255 and outputs the read-out data as display image data to the drive unit 220. Thus, on the screen SC, the information representing the channel of missing data is superimposed on the image based on the display image data (step S9).

After executing the processing of step S3 or S9 to project the projection image on the screen SC, the control unit 270 determines whether the reception of the image signal is finished or not (step S4). If the reception of the image signal not finished (NO in step S4), the control unit 270 returns to step S2 and determines whether an image signal is received on all of the first to fourth channels or not. If the reception of the image signal is finished (YES in step S4), the control unit 270 ends this processing flow.

As described above, the projector 200 in this embodiment has the image reception I/F unit 240 operating as the "image input unit", the signal detection unit 251 operating as the "detection unit", and the control unit 270 and the image processing unit 257 operating as the "generation unit".

The image reception I/F unit 240 has the first receiving unit 241 corresponding to the first channel and the second receiving unit 242 corresponding to the second channel, as a plurality of channels. The image reception I/F unit 240 also has the third receiving unit 243 corresponding to the third channel and the fourth receiving unit 244 corresponding to the fourth channel.

The image processing unit 257 processes pixel data inputted to each of the first receiving unit 241 to the fourth receiving unit 244 and generates display image data for displaying an image of one frame.

The signal detection unit 251 detects a missing of pixel data on each channel.

The control unit 270 causes the image processing unit 257 to execute interpolation processing if a missing of pixel data is detected.

The image processing unit 257 executes interpolation processing if a missing of pixel data is detected. Specifically, the image processing unit 257 interpolates and generates an image feature quantity of an unset pixel which is a pixel forming the display image data and whose image feature quantity cannot be set due to the missing of pixel data, based on the input data on the other channels where a missing of input data is not detected. In the interpolation processing, the image processing unit 257 interpolates the image feature quantity of the unset pixel with the image feature quantity of a reference pixel selected from pixels other than the unset pixel.

Thus, even if there is a channel where pixel data is missing, the influence of the missing of pixel data can be restrained.

The image processing unit 257 selects, as the reference pixel, a pixel whose luminance value as the image feature quantity is already set by the pixel data on the other channels, then finds a reference luminance value based on the luminance value of the selected reference pixel, and sets a luminance value of the unset pixel, based on the reference luminance value.

Thus, the luminance value of the unset pixel can be set, based on the luminance value of a pixel whose luminance value is already set.

The image processing unit 257 selects, as the reference pixel, an adjacent pixel which is adjacent to the unset pixel and whose luminance value as the image feature quantity is already set by the input data on the other channels.

Thus, the luminance value of the unset pixel can be set, based on the luminance value of the adjacent pixel whose luminance value is already set.

The image processing unit 257 selects, as the reference pixel, a plurality of pixels whose luminance value as the image feature quantity is already set by the input data on the other channels, and finds the average value of the luminance values of the plurality of reference pixels thus selected, as the reference luminance value.

Thus, the luminance value of the unset pixel can be set, based on the average value of the luminance values of the plurality of reference pixels whose luminance value is already set.

The image processing unit 257 sets the luminance value of the unset pixel to a luminance value resulting from adding a preset amount of shift to the reference luminance value.

Thus, the luminance value of the unset pixel can be set to a value shifted from the reference luminance value by the amount of shift.

The image processing unit 257 selects the luminance value of the unset pixel from a range decided by the reference luminance value and a luminance value resulting from adding a preset amount of shift to the reference luminance value.

Thus, the luminance value of the unset pixel can be set to a value within the range of the reference luminance value with an amount of shift added.

The projector 200 has the operation panel 233 or the remote controller 5, as an operation unit which accepts an operation. The image processing unit 257 selects one of the reference luminance value and a luminance value resulting from adding a preset amount of shift to the reference luminance value, according to an operation accepted by the operation panel 233 or the remote controller 5.

Thus, one of the reference luminance value and a luminance value resulting from adding a preset amount of shift to the reference luminance value can be selected as the luminance value of the unset pixel, according to a selection made by the user.

The control unit 270 and the display unit 235 of the projector 200 operate as a notification unit which carries out notification. If a missing of pixel data is detected by the signal detection unit 251, the control unit 270 causes the display unit 235 to display information of the channel where the missing is detected, on the display panel 237. The control unit 270 also controls the drive unit 220 to project the information of the channel where the missing of pixel data is detected, onto the screen SC.

This configuration can notify the user of a missing of pixel data.

The foregoing embodiment is a preferred form of embodiment of the invention. However, the invention is not limited to the embodiment and various modifications can be made without departing from the spirit of the invention.

For example, the setting information 267, that is, the setting of whether the image processing unit 257 is to execute processing based on the first setting or execute processing based on the second setting, can be changed by an operation on the operation panel 233 or the remote controller 5. On accepting an operation to change the setting information 267 in response to an operation on the operation panel 233 or the remote controller 5, the control unit 270 changes the setting information 267 according to the accepted operation and causes the storage unit 265 to store the changed setting information 267.

While the projector 200 in the embodiment is described as a liquid crystal projector using a transmission-type liquid crystal panel, a projector using a reflection-type liquid crystal panel or digital mirror device may be employed. The display device is not limited to a projector which projects an image on the screen SC, and may be a liquid crystal monitor or liquid crystal television which displays an image on a liquid crystal display panel. The display device may also be a monitor device or television receiver which displays an image on a PDP (plasma display panel). The display device may also be a monitor device or television receiver which displays an image on an organic EL display panel called OLED (organic light-emitting diode) or OEL (organic electroluminescence).

Each functional unit of the projector 200 shown in FIG. 3 represents a functional configuration implemented by a collaboration of hardware and software and is not particularly limited to any specific form of installation. Therefore, pieces of hardware corresponding individually to the respective functional units need not necessarily be installed. A single processor may execute a program to implement functions of a plurality of functional units. Apart of the functions implemented by software in the embodiment may be implemented by hardware. A part of the functions implemented by hardware may be implemented by software.

If the method for controlling the image display device is implemented using the computer provided in the image display device, the invention can be configured in the form of a program executed by the computer to implement the control method, a recording medium on which the program is recorded in a computer-readable manner, or a transmission medium which transmits the program. As the recording medium a magnetic or optical recording medium or a semiconductor memory device can be used. Specifically, a portable or fixed recording medium such as flexible disk, HDD (hard disk drive), CD-ROM (compact disk read-only memory), DVD (digital versatile disk), Blu-ray (trademark registered) disc, magneto-optical disk, flash memory, or card-type recording medium, may be employed. The recording medium may also be a non-volatile storage device such as a RAM (random access memory), ROM (read-only memory), or HDD which is an internal storage device provided in the image display device.

The units of processing shown in the flowchart of FIG. 6 are separated, corresponding to main processing contents, in order to facilitate understanding of the processing by the control unit 270 of the projector 200. The way the units of processing are separated and the names of these units shown in the flowchart of FIG. 6 do not limit the invention. The processing by the control unit 270 can be divided into a larger number of units of processing according to the processing contents. One unit of processing can be further divided to include more processes. The order of processing in the flowchart is not limited to the illustrated example.

What is claimed is:

1. An image display device comprising:
an interface circuit having a plurality of channels; and
one or more processors programmed to:
   process input data inputted to each of the plurality of channels and generate display image data for displaying an image of one frame, and
   detect a missing of input data on each of the channels, wherein
if the missing of input data is detected, the one or more processors (i) obtain setting information, and (ii) execute interpolation processing to interpolate and generate a luminance value of an unset pixel which is a pixel forming the display image data and whose luminance value cannot be set due to the missing of input data, based on the input data on other channels where the missing of input data is not detected,
in the interpolation processing,
   the luminance value of the unset pixel is interpolated with a reference luminance value of a reference pixel selected from pixels other than the unset pixel,
   in response to the setting information indicating a first setting and the reference luminance value being greater than or equal to a threshold, the reference luminance value is adjusted based on a preset amount of shift such that the preset amount of shift is subtracted from the reference luminance value,
   in response to the setting information indicating the first setting and the reference luminance value being less than the threshold, the reference luminance value is adjusted based on the preset amount of shift such that the preset amount of shift is added to the reference luminance value, and
   in response to the setting information indicating a second setting, the reference luminance value is not adjusted based on the preset amount of shift, and
the one or more processors select, as the reference pixel, a pixel whose luminance value is already set by the input data on the other channels, then find the reference luminance value of the selected reference pixel, and set the luminance value of the unset pixel, based on the reference luminance value.

2. The image display device according to claim 1, wherein the one or more processors select, as the reference pixel, an adjacent pixel which is adjacent to the unset pixel.

3. The image display device according to claim 1, wherein the one or more processors select, as the reference pixel, a plurality of pixels whose luminance value is already set by the input data on the other channels, and find an average value of the luminance values of the plurality of reference pixels thus selected, as the reference luminance value.

4. The image display device according to claim 1, wherein the one or more processors select the luminance value of the unset pixel from a range decided by using the reference luminance value and the preset amount of shift.

5. The image display device according to claim 1, further comprising a remote controller which accepts an operation,
   wherein the one or more processors set the setting information according to the operation accepted by the remote controller.

6. The image display device according to claim 1,
   wherein if the missing of input data is detected, the one or more processors notify information of the channel where the missing is detected.

7. The image display device according to claim 1, further comprising an operation panel which accepts an operation,
   wherein the one or more processors set the setting information according to the operation accepted by the operation panel.

8. A method for controlling an image display device having an interface circuit having a plurality of channels, the method comprising:
   processing input data inputted to each of the plurality of channels and generating display image data for displaying an image of one frame; and
   detecting a missing of input data on each of the channels, wherein
   in the generating, if the missing of input data is detected by the detecting, (i) obtaining of setting information, and (ii) interpolation processing to interpolate and generate a luminance value of an unset pixel which is a pixel forming the display image data and whose luminance value cannot be set due to the missing of input data, based on the input data on other channels where the missing of input data is not detected, are executed,
   in the interpolation processing,
      the luminance value of the unset pixel is interpolated with a reference luminance value of a reference pixel selected from pixels other than the unset pixel,
      in response to the setting information indicating a first setting and the reference luminance value being greater than or equal to a threshold, the reference luminance value is adjusted based on a preset amount of shift such that the preset amount of shift is subtracted from the reference luminance value,
      in response to the setting information indicating the first setting and the reference luminance value being less than the threshold, the reference luminance value is adjusted based on the preset amount of shift such that the preset amount of shift is added to from the reference luminance value, and
      in response to the setting information indicating a second setting, the preset amount of shift is not adjusted based on the reference luminance value, and
   in the generating, a pixel whose luminance value is already set by the input data on the other channels is selected as the reference pixel, the reference luminance value of the selected reference pixel is found, and the luminance value of the unset pixel is set, based on the reference luminance value.

9. The method for controlling the image display device according to claim 8, wherein in the generating, an adjacent pixel which is adjacent to the unset pixel is selected as the reference pixel.

10. The method for controlling the image display device according to claim 8, wherein in the generating, a plurality of pixels whose luminance value is already set by the input data on the other channels are selected as the reference pixel, and an average value of the luminance values of the plurality of reference pixels thus selected is found as the reference luminance value.

11. The method for controlling the image display device according to claim 8, wherein in the generating, the luminance value of the unset pixel is selected from a range decided by using the reference luminance value and the preset amount of shift.

12. The method for controlling the image display device according to claim 8, wherein an operation is accepted by a remote controller, and the setting information is set according to the operation accepted by the remote controller.

13. The method for controlling the image display device according to claim 8, wherein if the missing of input data is detected by the detecting, information of the channel where the missing is detected is notified.

14. The method for controlling the image display device according to claim 8, wherein an operation is accepted by an operation panel, and the setting information is set according to the operation accepted by the operation panel.

\* \* \* \* \*